Patented Feb. 7, 1933

1,896,658

UNITED STATES PATENT OFFICE

PHILIPPE DE GASPE BEAUBIEN, OF OUTREMONT, QUEBEC, AND JOHN F. SCHNEIDER, OF MONTREAL, QUEBEC, CANADA, AND FRANÇOIS M. DUPONT, OF CHICAGO, ILLINOIS, ASSIGNORS, BY DIRECT AND MESNE ASSIGNMENTS, TO THE CANADIAN RESEARCH CORPORATION, LIMITED, OF MONTREAL, QUEBEC, CANADA, A CORPORATION OF CANADA

METHOD OF MASHING MALT AND MALT MIXTURES

No Drawing. Application filed September 9, 1929. Serial No. 391,515.

Our invention relates to an improved method of effecting the conversion of water-insoluble carbohydrates and proteins of the malt, or of a mixture of malt and unmalted cereals, or of a mixture of malt and products of unmalted cereals, as the case may be, into soluble carbohydrates and proteins.

With our method we are able to obtain on a commercial scale, a considerably higher yield of soluble extract than has been possible heretofore with any other mashing process of which we are aware.

By our improved method we are able to convert insoluble carbohydrates, for example some of the pentosans, amylopectins and hemicelluloses and others, into soluble sugars, by the action of the enzymes existing in the malt, providing the optimum temperatures at which these enzymes give best results, are used.

In carrying out the present invention, no other apparatus is necessary than that heretofore used in practice, and the extract obtained from such a mash, contains all of the desirable ingredients to even a larger degree than has formerly been the case, as far as we are aware.

The present process is characterized by first producing through steeping the ground malt or malt mixture in water, a solution of the valuable enzymes, such as the carbohydrases, for example maltase, the polyases, for example diastase, hemicellulase, lichenase, cytase, galactase, and pentosanase and others of the group of proteases.

A part of this solution is then withdrawn from the grain solids, and the remaining mash is then gradually heated to such temperatures as are necessary to produce inversion. In this part of the method, the temperatures and times of treatment, depend upon the type and relative proportions of sugars desired.

The mash is then heated to the boiling point or higher temperatures, under pressure, in order to rupture the remaining cells, loosen the texture of the mash grains and produce partial hydrolysis. The mash and the previously withdrawn enzymatic solution are then mixed at the optimum temperature for enzymatic action. This can be accomplished by either cooling the boiled mash to the temperature of the enzymatic solution, or by running the hot mash slowly, and under vigorous agitation, into the enzymatic solution, thus making use of the heat of the mash to gradually raise the temperature of the mixture. In this mixture of the two parts of the original mash, a further inversion takes place by enzymatic action. The increase in yield is due to the inversion of the pentosans, amylopectins, lichenins and hemicelluloses, in addition to the conversion of starch cells which were unconverted in the previous operations. A further modification of some of the proteins also takes place at the lower temperatures.

The temperature is then gradually raised, in order to make use of the optimum temperature of the different enzymes in the solution, to secure the highest degree of inversion possible.

The following is a practical example of one procedure that may be followed in carrying out our process; malt is prepared in the usual manner from barley or other suitable grains, and the malt is crushed or ground in the usual manner. An infusion of the crushed or ground malt is then made with water, for example one part of the malt to two and one-half parts by weight of the water. The temperature of the infusion must be below 133° F., best results being obtained with a temperature of from 99° to 111° F., the particular temperature used depending on the quality of the malt employed and the type of extract desired. The mash is well mixed by agitation and then permitted to rest for a period permitting lexiviation and sedimentation, for example from one-half hour to one and one-half hours, depending on the nature of the malt and the fineness of its grinding. The grain solids in the mash having settled to the bottom of the containing vessel, a part of the liquid is withdrawn and stored in a separate vessel. The amount of liquid left in the mash should be sufficient to permit agitation and should contain sufficient enzymes in solution for the inversion of the then available proteins into modified soluble products, and the inversion of the then available insoluble carbohydrates into sugars. It will usually be found possible to draw off about one quarter of the bulk of the original mash. The withdrawn liquid contains in solution, enzymes from the malt.

After the enzyme solution has been withdrawn from the original mash, the temperature of the remaining mash is raised gradually while stirring with suitable agitators. Some of the proteins are thus further modified and brought into solution and gradually the then available starches are liquefied and saccharified. The temperature of the remaining mash is raised ultimately to, for example, about 167° F., but not higher than 176° F. at a faster or slower rate depending on the relative proportion of fermentable to unfermentable sugars desired. The mash is maintained at this temperature until the usual iodine test for starch is negative.

The mash is then heated to boiling temperature and boiled for about one hour, the time of boiling depending on the quality of the malt and the fineness of its grinding. This bursts the remaining cells, making available additional starches, other carbohydrates and proteins, effects partial hydrolysis of these substances, and loosens the texture of the mash grains. The boiled mash may then be run into the previously withdrawn enzyme solution gradually and with stirring, the speed of addition of the boiled mash depending on the desired conversion products, and in such a manner that the resulting temperature is, for example, 167° F. but not higher than 176° F. A better procedure is to cool the boiled mash and then to thoroughly mix it with the previously withdrawn enzyme solution, and to then heat the mixture gradually through the peptonizing temperature and later through the temperature permitting the carbohydrases, hemicellulases and cytases to produce soluble sugars; in this manner the temperature is gradually increased to, for example, about 167° F. and not to exceed 176° F., and the mixture is maintained at that temperature until conversion of the additional starches and other carbohydrates is shown to be complete by the iodine test. This will take but a short time, for example from five to ten minutes. The extract is then separated from the grain solids in any usual and desired manner.

While the process described as illustrative of the carrying out of our improved mashing method, is described in connection with malt alone, it will be understood that a mixture of malt and unmalted cereals or a mixture of malt and products of unmalted cereals or a mixture of malt and other starch containing materials, may be treated in the same manner, in which case the enzymes of the malt act upon the convertible portions of the unmalted cereals, products of unmalted cereals or other starch containing material, as the case may be, to make them soluble and bring them into the extract together with the converted constituents of the malt itself, in the manner above described.

The process described can be used wherever a complete conversion of starchy products is desired by the enzymes contained in the malt, such as in the manufacture of cereal beverages, vinegar, yeasts, breakfast foods and syrups.

In making cereal beverages any desired known procedure may be employed. A marked advantage of our process described, is a much higher yield of soluble products in the extract, than has been effected heretofore by any mashing process of which we are aware, as a result of which a larger percentage of the convertible portions of the grains or cereals is secured in the extract.

Another advantage of our process is that the turbidity of the extract can never be ascribed to starches and amylopectins as they are fully converted. It is therefore possible to siphon off some of the liquid portion above the grain solids and also filter off the remaining liquid faster through the grains than was formerly the case. It is also possible to wash the grains faster and at higher temperature than before because no danger of so called starch turbidity exists.

While we have described our invention as consisting of the particular steps of treatment referred to, it will be understood that we do not limit ourselves specifically to the same, as similar steps may be employed in carrying out our invention, the important feature of our improved process being that the insoluble portions of the original malt or malt mixture shall be subjected successively to separate enzymatic treatments, with an intermediate treatment of the solids causing bursting of the remaining cells, loosening of the texture of the grain solids, and partial hydrolysis, to the end that subsequent enzymatic action may be effected.

In the claims we refer to the substance acted upon as "milled cereal product", meaning thereby malt, a mixture of malt and unmalted cereal or cereals, a mixture of malt and a product or products of unmalted cereal or cereals, a mixture of malt and starch bearing material, or any combination of the same, which cereal product has been milled in a crushing or grinding mill, as preferred, to a desired degree of fineness thus constituting the cereal product a milled product ready for mashing.

What we claim is:

1. The method of mashing cereal products, consisting of mixing the milled cereal product with water at substantially from 99° to 111° F. in the proportion of substantially two and one-half parts of water to one part and maintaining the mash at not to exceed the latter temperature until the mash again tests negative with the iodine test.

8. The method of mashing cereal products, consisting of mixing milled cereal product with hot water to form a mash, withdrawing from the mash a portion of the enzymatic liquid thereof, heating the remaining mash to not to exceed 176° to effect saccharification of the starchy constituents, boiling the mash, and running the hot mash into the withdrawn enzymatic liquid in a manner to produce a temperature of the mixture of not to exceed 176° F. to effect saccharification of carbohydrates released by the boiling.

9. The method of mashing cereal products, consisting of mixing the milled cereal product with water to form a mash and producing an enzymatic solution thereby, withdrawing a part of said solution, heating the remaining mash to effect saccharification, boiling the remaining mash, and running the hot mash into the withdrawn enzymatic solution to effect further saccharification.

10. The method of mashing cereal products, consisting of mixing the milled cereal product with water at substantially from 99° to 111° F. in the proportion of substantially two and one-half parts of water to one part of said cereal product by weight to form the original mash, permitting said mash to rest at said temperature for from one to two hours to dissolve the readily soluble constituents of said cereal product including a part of the enzymes of the malt thereof and to effect conversion and solution of part of the convertible proteins of said cereal product, withdrawing a part of the enzymatic liquid portion of the mash, raising the temperature of the remaining mash through the peptonizing and saccharifying temperatures to not to exceed 176° F. at a rate depending upon the proportions of fermentable and non-fermentable sugars desired and until the mash tests negative with the iodine test, rupturing starch and other carbohydrate cells of the mash grains including hemicelluloses, lichenins, amylopectins and pentosans and effecting partial hydrolysis, mixing the mash with the previously withdrawn enzymatic liquid portion to produce a temperature of not to exceed 176° F. and maintaining the mash at not to exceed the latter temperature until the mash again tests negative with the iodine test to convert carbohydrates including starches, hemicelluloses, lichenins, amylopectins and pentosans made available by the said rupturing of the cells.

11. The method of mashing cereal products, consisting of mixing the milled cereal product with hot water to form a mash, withdrawing from the mash a portion of the enzymatic liquid thereof, heating the remaining mash to not to exceed 176° F. to effect saccharification of the starchy constituents, rupturing starch and other carbohydrates of the mash grains including hemicelluloses, lichenins, amylopectins and pentosans and effecting partial hydrolysis, and mixing the mash with the withdrawn enzymatic liquid to produce a temperature of not to exceed 176° F. to effect saccharification of the then available carbohydrates.

12. The method of mashing cereal products, consisting of mixing the milled cereal product with water to form a mash and producing an enzymatic solution thereby, withdrawing a part of said solution, heating the remaining mash to effect saccharification, rupturing starch and other carbohydrates of the mash grains including hemicelluloses, lichenins, amylopectins and pentosans and effecting partial hydrolysis, and mixing the mash with the withdrawn enzymatic solution to effect saccharification of the then available carbohydrates.

In witness whereof, we, PHILIPPE DE GASPE BEAUBIEN and JOHN F. SCHNEIDER hereunto subscribe our names this 27th day of August, A. D. 1929.

PHILIPPE DE GASPE BEAUBIEN.
JOHN F. SCHNEIDER.

In witness whereof, I, FRANÇOIS M. DUPONT hereunto subscribe my name this 21st day of August, A. D. 1929.

FRANÇOIS M. DUPONT.

of said cereal product by weight to form the original mash, permitting said mash to rest at said temperature for from one to two hours to dissolve the readily soluble constituents of said cereal product including a part of the enzymes of the malt thereof and to effect conversion and solution of part of the convertible proteins of said cereal product, withdrawing a part of the enzymatic liquid portion of the mash, raising the temperature of the remaining mash through the peptonizing and saccharifying temperatures to not to exceed 176° F. at a rate depending upon the proportions of fermentable and non-fermentable sugars desired and until the mash tests negative with the iodine test, raising the temperature of the mash and boiling the same to rupture the remaining cells and effect partial hydrolysis, mixing the boiled mash with the previously withdrawn enzymatic liquid portion to produce a temperature of not to exceed 176° F., and maintaining the mash at not to exceed the latter temperature until the mash again tests negative with the iodine test.

2. The method of mashing cereal products, consisting of mixing the milled cereal product with water at substantially from 99° to 111° F. in the proportion of substantially two and one-half parts of water to one part of said cereal product by weight to form the original mash, permitting said mash to rest at said temperature for from one to two hours to dissolve the readily soluble constituents of said cereal product including a part of the enzymes of the malt thereof and to effect conversion and solution of part of the convertible proteins of said cereal product, withdrawing a part of the enzymatic liquid portion of the mash, raising the temperature of the remaining mash through the peptonizing and saccharifying temperatures to not to exceed 176° F. at a rate depending upon the proportions of fermentable and non-fermentable sugars desired and until the mash tests negative with the iodine test, raising the temperature of the mash and boiling the same to rupture the remaining cells and effect partial hydrolysis, cooling the boiled mash, mixing the cooled mash with the previously withdrawn enzymatic liquid portion, raising the temperature of the resulting mash more or less quickly to not to exceed 176° F. depending upon the proportions of fermentable and non-fermentable sugars desired, and maintaining the mash at not to exceed the latter temperature until the mash again tests negative with the iodine test.

3. The method of mashing cereal products, consisting of mixing the milled cereal product with hot water to form a mash, withdrawing from the mash a portion of the enzymatic liquid thereof, heating the remaining mash to not to exceed 176° F. to effect saccharification of the starchy constituents, boiling the mash, and mixing the boiled mash with the withdrawn enzymatic liquid to produce a temperature of not to exceed 176° F. to effect saccharification of carbohydrates released by the boiling.

4. The method of mashing cereal products, consisting of mixing the milled cereal product with hot water to form a mash, withdrawing from the mash a portion of the enzymatic liquid thereof, heating the remaining mash to not to exceed 176° F. to effect saccharification of the starchy constituents, boiling the mash, cooling the boiled mash, mixing the cooled mash with the withdrawn enzymatic liquid, and heating the resulting mash to not to exceed 176° F. to effect saccharification of carbohydrates released by the boiling.

5. The method of mashing cereal products, consisting of mixing the milled cereal product with water to form a mash and producing an enzymatic solution thereby, withdrawing a part of said solution, heating the remaining mash to effect saccharification, boiling the remaining mash, and mixing the boiled mash with the withdrawn enzymatic solution to effect further saccharification.

6. The method of mashing cereal products, consisting of mixing the milled cereal product with water to form a mash and producing an enzymatic solution thereby, withdrawing a part of said solution, heating the remaining mash to effect saccharification, boiling the remaining mash, cooling the boiled mash, mixing the cooled mash with the withdrawn enzymatic solution, and heating the resulting mash to effect further saccharification.

7. The method of mashing cereal products, consisting of mixing the milled cereal product with water at substantially from 99° to 111° F. in the proportion of substantially two and one-half parts of water to one part of said cereal product by weight to form the original mash, permitting said mash to rest at said temperature for from one to two hours to dissolve the readily soluble constituents of said cereal product including a part of the enzymes of the malt thereof and to effect conversion and solution of part of the convertible proteins of said cereal product, withdrawing a part of the enzymatic liquid portion of the mash, raising the temperature of the remaining mash through the peptonizing and saccharifying temperatures to not to exceed 176° F. at a rate depending upon the proportions of fermentable and non-fermentable sugars desired and until the mash tests negative with the iodine test, raising the temperature of the mash and boiling the same to rupture the remaining cells and effect partial hydrolysis, running the hot mash into the previously withdrawn enzymatic liquid portion in a manner to produce a temperature of the mixture of not to exceed 176° F.,